United States Patent Office 2,757,171
Patented July 31, 1956

2,757,171

STABILIZED CASEIN

Alfred K. Mozingo and Harold K. Salzberg, Bainbridge, N. Y., assignors to The Borden Company, a corporation of New Jersey No Drawing. Application July 13, 1955,
Serial No. 521,920

4 Claims. (Cl. 260—119)

This invention relates to stabilized casein and the process of making it.

The variability of casein in storage is a problem of long standing. Casein solutions quickly undergo putrefaction when kept at room temperature. Up to this time there has been no manner of preventing such change and particularly the putrefaction without using such severe treatment or such large proportion of additive as to be objectionable in many uses of casein.

We have now discovered a process for making a casein so stable that its water solution remains fresh for several months. This result we obtain with the use only of reacting materials in proportions so slight as not to interfere with the utility of the product.

Briefly stated, our invention comprises the process of and the product resulting from the simultaneous chlorination and peroxidation of casein. In its commercial form, the invention comprises generating chlorine (so-called nascent chlorine) directly in contact with the casein and also with a peroxide.

We have found particularly satisfactory results when the source of chlorine is hydrochloric acid or other soluble chloride, the casein is reacted in moist condition, and the acid or other chloride is dissolved and in contact with the casein at the time the peroxide is reacting therewith.

The stabilized casein, when dried and milled, is a powder of light color with a slight orange cast and good solubility in dilute alkali. It is substantially stable in storage in aqueous solutions, being non-putrefying for various periods of time that may extend to 8 months or longer. The product contains only a very minor proportion, less than 1% of the chlorine.

We consider that our process using relatively small proportions of peroxide and chloride, involves liberation of hydrochloric acid by contact of acid of casein with the chloride, followed by release of chlorine in active form through action of the peroxide. We consider also that oxychlorination occurs on the phenolic groups normally present in the casein molecule.

As to materials, the casein used may be and ordinarily is of the acid precipitated type. There is no advantage known in substitution of casein made in other manner as, for example, by the rennet process.

The peroxide is ordinarily supplied in the form of commercial hydrogen peroxide solution. It may be supplied, however, by another source such as barium, strontium, or sodium peroxide. In such case, an aqueous acid, in proportion calculated to liberate the hydrogen peroxide from the metallic peroxide, is included in the composition. Examples of such acids that may be used are acetic or very dilute hydrochloric or sulfuric in amounts to lower the pH of the mixture of the peroxide, as to the range 4–5.

The source of chlorine may be ammonium chloride, lithium chloride or other soluble metal chloride, or it may be hydrochloric acid. Some preference is shown for the inclusion of hydrochloric acid with the chloride salt as a means of adjusting the pH of the reaction mixture downward to the range of 4 to 5, where the reaction takes place most effectively.

Representative proportions in which the materials may be used are shown in the following table:

| Material | Parts by Weight | |
|---|---|---|
| | Suitable Com'l. Proportion | Permissible Range |
| Casein | 100 | 100 |
| Hydrogen peroxide (anhydrous weight) | 2 | 0.5–5 |
| Chlorine source (calc. as Cl$_2$) | 2 | 0.3–3 |
| Water | 7 | 2–30 |

The sole source of water may be the hydrogen peroxide, or extra water may be added in amount to further moisten the casein as well as dissolve any chloride used as the source of chlorine. Water may also be used as diluent where more concentrated grades of hydrogen peroxide are employed or as solvent for a metallic peroxide should such be the oxygen source.

The casein, peroxide, and source of chlorine are caused to remain in contact in moist condition until reaction is substantially complete. When the reaction is effected at a moderately elevated temperature, as at 50°–80° C., then reaction proceeds at such a rate that the completeness of it may be judged by cessation of heat evolution by the exothermic reaction.

Example 1

1. Argentine casein _____ g__ 100
2. Water _____ cc__ 7
   Ammonium hydroxide, 28%–30% _____ cc__ 1
   Concentrated hydrochloric acid, 38% _____ cc__ 2
3. Water _____ cc__ 15
   Hydrogen peroxide, 30% _____ cc__ 5

Solution 2 was blended with the casein followed by Solution 3. The reaction mixture was then allowed to stand for 2 days at room temperature. The treated casein was soaked in 500 cc. water for ½ hour. After the addition of 6.5 cc. of conc. ammonia, the solution was heated at 80° C. for 5 minutes. The resulting solution containing no added preservative showed no evidence of growth of microorganisms on storage at 25° C. for 8 months.

Example 2

1. New Zealand casein _____ g__ 100
2. Ammonium chloride, granular _____ g__ 5.6
3. Hydrogen peroxide, 30% _____ cc__ 5

The ammonium chloride was blended with the casein followed by the hydrogen peroxide. The mixture was placed in a sealed glass jar and heated at 65° C. for 7 hours. An aqueous ammonia solution of the product at pH 7 (17% casein) containing no preservative showed no evidence of growth of microorganisms on storage at 25° C. for 8 months. The product is not as uniform as that made with water in addition to that supplied by the aqueous peroxide solution.

Example 3

1. New Zealand casein _____ g__ 100
2. Ammonium chloride C. P. granular _____ g__ 5.6
3. Water _____ cc__ 30
   Hydrogen peroxide, 30% Merck _____ cc__ 5

The ammonium chloride was blended with the casein followed by the aqueous hydrogen peroxide solution. The blend was placed in a sealed glass jar and heated at 65° C. for 18 hours. An aqueous ammonia solution of the product at pH 7 (17% casein) showed no evidence of the growth of microorganisms in 6 months.

Example 4

1. New Zealand casein _____ g __ 100
2. Water _____ cc __ 5.5
   Hydrochloric acid, 38% _____ cc __ 2.0
   Lithium chloride _____ g __ 2.4
3. Hydrogen peroxide, 30% technical _____ cc __ 2.5

Solution 2 was blended with the casein followed by olution 3. The blend was placed in a sealed glass jar nd heated at 65° C. for 18 hours. An aqueous ammonia olution of the product at pH 7 (17% casein) showed no vidence of growth of microorganisms at 2 months.

Example 5

1. New Zealand casein _____ g __ 2000
2. Ammonium chloride, technical _____ g __ 112
3. Water _____ cc __ 30
   Hydrochloric acid, 38% _____ cc __ 20
   Hydrogen peroxide, 30% technical _____ cc __ 150

The ammonium chloride was blended with the casein in a mixer equipped with a stainless steel paddle and bowl. Solution 3 was blended with the casein and ammonium chloride for 5 minutes. The blend was then placed in a sealed glass jar and placed in an oven at 60° C. for 5 hours. An aqueous ammonium solution at pH 7 (17% casein) did not show any evidence of growth of microorganisms when stored at either 25° C. or 50° C. for 2 months.

Example 6

1. New Zealand casein _____ g __ 1000
2. Water _____ cc __ 60
   Hydrochloric acid, 38% _____ cc __ 20
   Ammonium hydroxide, 28–30% _____ cc __ 20
3. Water _____ cc __ 125
   Hydrogen peroxide, 30% technical _____ cc __ 75

Solution 2 was blended with the casein followed by Solution 3. The blend was placed in a sealed glass jar and kept in a 40° C. oven for 17 hours followed by 23 hours at 50° C. An aqueous ammonia solution at pH 7 (17% casein) did not shown any evidence of the growth of microorganisms when stored at 25° or 45° C. for 2 months.

Example 7

1. New Zealand casein _____ g __ 1500
2. Ammonium chloride, technical _____ g __ 84
3. Water _____ cc __ 337
   Hydrogen peroxide, 30% technical _____ cc __ 113

The ammonium chloride was blended with the casein followed by Solution 3. The blend was placed in a glass jar and heated in an oven at 65° C. for 8 hours. The aqueous ammonium solutions at pH 7 (17% casein) did not show any evidence of the growth of microorganisms when stored at either 25° or 45° C. for 2 months.

Example 8

|   | Pounds |
|---|---|
| 1. New Zealand casein | 100 |
| 2. Ammonium chloride, technical | 5.6 |
| 3. Water | 22.5 |
| Hydrogen peroxide, 30% technical | 7.5 |

In a stainless steel mixer equipped with hot and cold water circulation, the casein was charged followed by the ammonium chloride. The hydrogen peroxide solution and water were added cold and, after the chemicals were thoroughly blended the casein was placed in closed containers, which were placed in an oven held at 60° C. After 24 hours, the product was removed and allowed to cool by standing in the open air.

The analysis of products made as described in the above examples showed that chlorine had been introduced into the casein in amounts ranging between 0.1% and 0.5, dry basis.

Example 9

The product of Example 8 was used in preparing a paint of the water-dilutable latex type. These paints are often compounded with casein and preservatives therefor. By using the chlorine treated casein of our invention, instead of ordinary untreated casein, an extra margin of safety against spoilage of the paint in storage is attained. Furthermore, such paints can be prepared without the inclusion of any preservatives.

A dispersion of the product of Example 8 of 18% concentration in ammonia at pH 9 was incorporated in a paint formula using a commercial butadiene/styrene latex as vehicle. The formula was modified from usual procedure by leaving out the preservatives, as well as the pigment dispersant. Casein treated by our process has pigment dispersing power as well as preservative value in its own right. The formula was:

|   | G. |
|---|---|
| 1. Titanium dioxide pigment | 250 |
| 2. Lithopone pigment | 100 |
| 3. Mica | 56 |
| 4. Water | 215 |
| 5. Solution of treated casein | 84 |
| 6. Latex | 379 |
| 7. Tributyl citrate defoamer | 1.8 |
| 8. Ammonia to pH 9.0–9.5. | |

The resulting paint is of good body, smoothness and leveling properties. Furthermore in storage undesirable changes with respect to viscosity, spoilage, lumping and pigment separation do not occur.

Although solutions of casein stabilized by this process have an excellent storage history in regard to freedom from bacterial and mold growth, this is not the only improvement which the molecule has undergone. Another benefit is the modification of the highly variable, denatured casein molecule to one which is relatively uniform in molecular weight and charge. For example, oxychlorination has improved New Zealand casein as a latex paint stabilizer through the formation of a large number of basic and acidic groups. As a result, paints made with stabilized casein are stable in viscosity on storage and have substantially the same viscosity batch after batch. On the other hand, different lots of unprocessed New Zealand casin produce latex paints which are variable in their original viscosity and variable also as to the extent to which they thicken on storage. Hydrolyzing the casein with enzymes is a conventional but far more expensive treatment than our oxychlorination process for overcoming this difficulty.

Our simultaneous peroxidation and chlorination of casein modifies the molecule so that the basic unit is about one-fourth as large as the derived New Zealand casein molecule. New Zealand casein may be visualized as four units of alpha, beta or gamma caseins associated intermolecularly. In stabilized casein these four units exist in solution separately due to intramolecular association. The change from inter to intramolecular association is attributed to the formation of large numbers of positive and negative groups on the surface of the molecule which promote intramolecular association.

Whatever the exact explanation of the mechanism of our reaction may be, we obtain important stabilization against objectionable viscosity change and putrefaction.

It will be understood that it is intended to cover all changes and modifications of the examples of the invention herein chosen for the purpose of illustration which do not constitute departures from the spirit and scope of the invention.

What is claimed is:

1. In stabilizing casein against putrefaction of its aqueous solution in storage, a process which comprises forming an acidified mixture of casein, an inorganic chloride, hydrogen peroxide, and water and maintaining the mixture at a temperature between 0° and 100° C. until reaction is subsequently complete, the water being used in proportion to dissolve the source of chlorine and moisten the casein and the process giving a stabilized casein.

2. The process of claim 1 in which the pH of the said mixture is established within the range 4–5.

3. The process of claim 1 in which the said chloride is hydrogen chloride.

4. Stabilized casein characterized by being substantially non-putrefactive in aqueous solution, containing chlorine in the proportion of about 0.1–0.5 part for 100 parts of the product, being in partly oxidized condition, and being the product of the method described in claim 1.

References Cited in the file of this patent

UNITED STATES PATENTS 2,312,467     Atwood _____ Mar. 2, 1943